United States Patent
Comes et al.

(10) Patent No.: US 6,422,569 B1
(45) Date of Patent: Jul. 23, 2002

(54) SNAP-IN RETAINER FOR A FLUID SEAL

(75) Inventors: Val C. Comes; Eric R. Anderson, both of Salt Lake City, UT (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/589,392

(22) Filed: Jun. 7, 2000

Related U.S. Application Data
(60) Provisional application No. 60/168,053, filed on Nov. 30, 1999.

(51) Int. Cl.$^7$ .................................................. F16J 9/12
(52) U.S. Cl. ..................... 277/437; 277/572; 277/575; 277/925
(58) Field of Search ................. 277/435, 437, 277/572, 578, 616, 637, 621, 623, 624, 925, 516, 619, 626, 511, 575; 403/315–317, 326, 371; 285/340, 345, 322–324

(56) References Cited

U.S. PATENT DOCUMENTS

| | | | |
|---|---|---|---|
| 2,230,725 A | * | 2/1941 | Nathan |
| 2,272,811 A | | 2/1942 | Nathan |
| 2,718,444 A | * | 9/1955 | Harris |
| 2,970,871 A | * | 2/1961 | Flick |
| 2,991,092 A | | 7/1961 | MacKay |
| 3,670,630 A | | 6/1972 | Tyson et al. |
| 3,782,840 A | * | 1/1974 | Brishka ....................... 403/361 |
| 3,868,192 A | | 2/1975 | Pwnnington et al. |
| 4,005,883 A | * | 2/1977 | Guest ......................... 285/322 |
| 4,097,074 A | | 6/1978 | Nagao et al. |
| 4,111,441 A | * | 9/1978 | Sick et al. |
| 4,114,898 A | * | 9/1978 | Bainard et al. |
| 4,139,204 A | * | 2/1979 | Howe |
| 4,143,586 A | * | 3/1979 | Zitting |
| 4,146,254 A | * | 3/1979 | Turner et al. ............... 285/105 |
| 4,195,849 A | * | 4/1980 | Taft |
| 4,524,997 A | | 6/1985 | Ebert |
| 4,601,235 A | * | 7/1986 | Roberts ........................ 92/245 |

(List continued on next page.)

FOREIGN PATENT DOCUMENTS

| | | |
|---|---|---|
| DE | 4033930 | 4/1992 |
| FR | 2623117 | 5/1989 |
| GB | 2053413 | 2/1981 |

OTHER PUBLICATIONS
Copy of International Search Report in corresponding PCT Application No. PCT/US00/29441.

Primary Examiner—Anthony Knights
Assistant Examiner—Alison K. Pickard
(74) Attorney, Agent, or Firm—John A. Molnar, Jr.

(57) ABSTRACT

A retainer for the installation of a seal or other component within a machine assembly including concentric first and second machine parts. One of the machine parts is formed as including a gland having a forward end wall and first and second peripheral walls. The first peripheral wall is spaced-apart a first distance from the other machine part and extends intermediate the forward end wall and an open rearward end, with the second peripheral wall being formed contiguously within the first peripheral wall intermediate the forward end wall and the open rearward end. The second peripheral wall is spaced-apart a greater second distance from the opposing machine part, and terminates at a rearward end wall. The retainer has an annular body configured to be receivable intermediate the first and second machine parts. The body extends from a forward end portion receivable within the gland to a rearward end portion configured as defining a plurality of cantilevered segments each extending from a proximal end to a distal end and having a camming surface. The segments are resiliently yieldable responsive to the bearing of the camming surface on the first peripheral wall of the gland to allow the retainer forward end portion to be advanced forwardly through the gland open rearward end. The distal ends of the segments are interferingly engageable with the gland rearward end wall delimiting the rearward movement of the retainer of out the gland.

18 Claims, 5 Drawing Sheets

U.S. PATENT DOCUMENTS

| | | | |
|---|---|---|---|
| 4,635,975 A | * | 1/1987 | Campbell .................... 285/340 |
| 4,813,808 A | * | 3/1989 | Gehrke ........................ 403/326 |
| 4,818,209 A | | 4/1989 | Peterson et al. |
| 4,867,043 A | * | 9/1989 | Antkowiak ................ 92/165 R |
| 5,058,907 A | | 10/1991 | Percebois et al. |
| 5,171,045 A | * | 12/1992 | Pasbrig ....................... 285/308 |
| 5,205,568 A | * | 4/1993 | Stoll et al. |
| 5,584,513 A | * | 12/1996 | Sweeny et al. ............. 285/323 |
| 5,738,358 A | | 4/1998 | Kalsi et al. |
| 5,909,902 A | * | 6/1999 | Seabra ........................ 285/322 |
| 5,915,738 A | * | 6/1999 | Guest ........................... 285/24 |
| 6,065,779 A | * | 5/2000 | Moner et al. ................. 285/23 |
| 6,227,548 B1 | * | 5/2001 | Netzer ........................ 277/502 |

* cited by examiner

SNAP-IN RETAINER FOR A FLUID SEAL

CROSS-REFERENCE TO RELATED APPLICATIONS

This application claims priority of U.S. Provisional Application Serial No. 60/168,053, filed Nov. 30, 1999.

BACKGROUND OF THE INVENTION

The present invention relates broadly to packings, seals, pistons, and like components for reciprocating or otherwise movable machine parts such as may be found in hydraulic or pneumatic cylinders or other actuators, and more particularly to a retainer for such components which may be used to retain such components in or on a machine part without the need to machine a full cavity or gland in the part for receiving the component.

Fluid seals, also known as packing rings, for machine part joints are well-known in the art. A typical application therefor involves the provision of a fluid seal intermediate relatively movable or reciprocating surfaces such as the outer surface of the rod of a hydraulic or pneumatic cylinder, or other fluid actuator, which reciprocates axially relative to an internal bore or other inner surface of a stationary, surrounding housing. Such seals, known in the vernacular as rod seals, conventionally are configured in a free state as a generally annular element which is molded or otherwise formed of an elastomeric or other resilient material such as a synthetic, natural, or co-polymer rubber, or a polymeric material such as a silicone, fluoropolymer, or, preferably, a polyurethane or fluoropolymer. Typically, the rod seal element is seated within an annular sealing gland or cavity which is provided within one of the surfaces, such as an internal bore of the cylinder housing, with the opening of the gland oriented as facing the other surface such as the outer surface of reciprocating rod. Within the gland, the seal is interposed between the rod, which is received coaxially through the seal for reciprocation within the cylinder bore, and a circumferential, peripheral side wall of the gland. As the piston rod reciprocates along a longitudinal axis within the bore, the seal functions to engage the reciprocating surface of the piston and the side wall of the gland to provide, respectively, a dynamic and static seal therebetween. In this regard, as installed under stress within the gland the seal presents in an energized or deformed state low and high pressure radial surfaces each disposed adjacent a corresponding side of the fluid pressure system, and inner and outer axial surfaces each defining one or more contact surfaces with a corresponding, opposing surface of the rod and gland.

It has been observed, however, that the machining of a full gland, i.e., having both a forward and rearward end wall, in the rod, housing, or other machine part sometimes presents difficulties. For example, in the case of small piston and rod sizes, tooling limitations and space constraints complicate the machine of a full gland. Moreover, and depending upon the relative geometry of the respective machine parts, the installation of a seal or the like within a full gland is itself sometimes problematic.

The demands on fluid power equipment, such as hydraulic cylinders and other actuators, occasioned by higher operating pressures, harsher service environments, closer tolerances, smaller sizes, and other factors have continued to increased. It therefore will be appreciated that further improvements in seals and sealing systems therefor would be well-received by the industry.

BROAD STATEMENT OF THE INVENTION

The present invention is directed to improvements in the mounting of seals, packing, pistons, and like components within machine assemblies having, for example, a reciprocating shaft such as a piston rod or ram of a hydraulic or pneumatic cylinder or other actuator. The improvement includes the provision of a generally annular, collet-like retainer which is receivable within a gland defined between a first and a concentric second machine part of the machine assembly.

The assemblies of the type herein involved may be characterized generally as including a first machine part having a generally annular surface which extends along a central longitudinal axis, and a second machine part having a generally cylindrical surface disposed in concentric opposition to the annular surface of the first machine part. One or both of the machine parts may be reciprocatingly movable relative to the other machine part in a forward and a rearward direction along the central longitudinal axis.

In accordance with the precepts of the present invention, a first one of the surfaces of the first or second machine part is provided as having a gland defined therein. The gland is formed as having a forward end wall and a first peripheral wall. The first peripheral wall is spaced-apart a first radial distance from the opposing second one of the surfaces of the first or second machine parts, and extends intermediate the forward end wall and an open rearward end. The gland further has a second peripheral wall which is formed contiguously with the first peripheral wall intermediate the forward end wall and the open rearward end. The second peripheral wall is spaced-apart a second radial distance greater than the first radial distance from the opposing second one of the surfaces of the first or second machine part, and terminates at a rearward end wall.

The retainer includes a generally annular body configured to be receivable coaxially intermediate the first and second machine parts. The body extends along the longitudinal axis from a forward end portion receivable within the gland to a rearward end portion configured as defining a plurality of cantilevered segments, each of the segments extending from a proximal end to a distal end and having a camming surface. The segments are resiliently yieldable responsive to the bearing of the camming surface on the first peripheral wall of the gland to allow the retainer forward end portion to be advanced coaxially along the gland first peripheral wall and into disposition within the gland intermediate the second peripheral wall and the forward end wall thereof. The distal end of the segments is interferingly engageable with the rearward end wall of the gland delimiting rearward movement of the retainer forward end portion out disposition within the gland.

In a first illustrative embodiment particularly adapted, for example, for the retention of rod seals and the like, the gland is defined within the annular surface of the first machine part with the first peripheral wall being sized as having a given first diametric extent. The camming surface of the retainer body segments extends radially outwardly with respect to the longitudinal axis to define a second diametric extent of the segments which is greater than the first diametric extent of the gland first peripheral wall. However, in order to allow the retainer body forward end portion to be advanced along the gland first peripheral wall, the retainer segments are made to be collapsible radially inwardly responsive to the bearing of the camming surface on the gland first peripheral wall.

In a second illustrative embodiment particularly adapted, for example, for the retention of piston seals and the like, the gland is defined within the cylindrical surface of the second machine part with the first peripheral wall being sized as having a given first diametric extent. The camming surface of the retainer body segments extends radially inwardly with respect to the longitudinal axis to define a second diametric extent of the segments which is less than the first diametric extent of the gland first peripheral wall. However, in order to allow the retainer body forward end portion to be advanced along the gland first peripheral wall, the retainer segments are made to be expandable radially outwardly responsive to the bearing of the camming surface on the gland first peripheral wall.

Particularly in either of the first and second embodiments, a unidirectional or bidirectional, generally annular fluid seal member may be retained by the retainer within the gland. In this regard, the forward end portion of the retainer body is provided to terminate at a forward radial end surface, with the rearward end portion of the retainer body terminating at a rearward radial end surface. The fluid seal member is mounted separately or integrally with the retainer forward end portion within the gland intermediate the forward end wall thereof and the forward radial surface of the retainer body. The rearward radial end surface of the retainer body is abuttingly engageable with the rearward end wall of the rearward gland to retain the seal member intermediate the gland forward end wall and the forward radial end surface of the retainer body. Optionally, the seal member may be bonded to the forward radial end surface of the retainer, with the seal member being formed in such arrangement of an elastomeric material, and the retainer being formed of resilient plastic material.

Alternatively, and particularly in the second mentioned embodiment, the retainer may be configured a having a radially-outwardly extending forward radial surface and a radially-outwardly extending rearward radial surface spaced-apart from the forward radial surface along the longitudinal axis to define a circumferentially-extending portion therebetween. In such a configuration, the retainer may function as a piston head in that the circumferentially-extending portion may be made responsive to a fluid pressure acting on one of the forward or the rearward radial surface to move the second machine part in a corresponding forward or rearward direction.

The present invention, accordingly, comprises the apparatus and method possessing the construction, combination of elements, and arrangement of parts and steps which are exemplified in the detailed disclosure to follow. Advantages of the present invention include the provision of a retention system for the installation of components in or on one of a pair of reciprocating machine parts which is adaptable to a variety of part sizes and geometries. Additional advantages include a method of retaining seals, pistons, and other components between reciprocating machine parts which facilitates the installation of the component while obviating the need machine a full cavity or gland in the parts. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
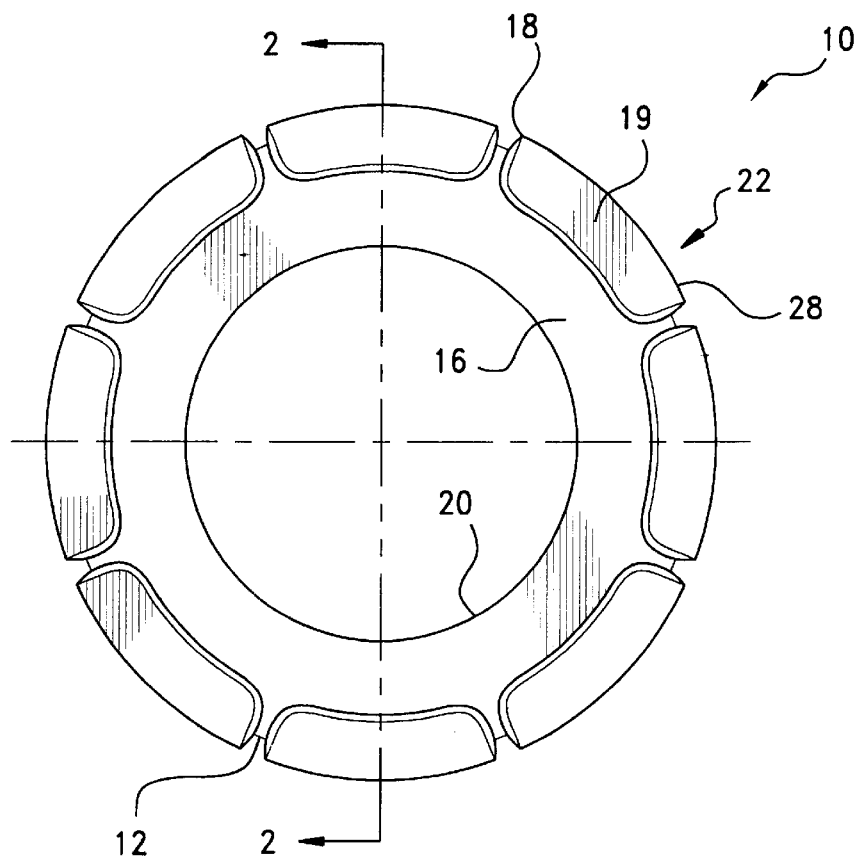
FIG. 1 is a rearward end view of a representative embodiment of the retainer of the present invention.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, and the terms "radial" and "axial" referring, respectively, to directions and surfaces perpendicular and parallel to the longitudinal central axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes, the precepts of the retainer of the invention herein involved are described in connection with its use within a machine assembly such as a double-acting hydraulic or pneumatic cylinder wherein a one machine part, such as a piston or rod, is reciprocable or otherwise displaceable relative to another machine part, such as a housing of the cylinder. In view of the discourse to follow, however, it will be appreciated that aspects of the present invention may find utility in other machine assemblies involving relatively-movable, concentrically-disposed surfaces, or in like rotary or static sealing applications. Use within those such other applications therefore should be considered to be expressly within the scope of the present invention.

As is detailed further in, for example, U.S. Pat. No. 4,268,045, cylinders of the variety herein involved conventionally include a cylindrical pressure vessel which is divided into a first and second chamber by a movable piston. Attached to the piston is an elongate piston rod which extends from the pressure vessel through the bore of a cylinder head or end cap. The piston rod, which may be connected to a load, is reciprocally positionable via hydraulic or pneumatic fluid pressure selectively admitted into the first or second chamber for effecting the linear translation of the piston within the pressure vessel. For example, fluid pressure may be supplied into the first chamber for extending the rod, or, alternatively, into the second chamber for retracting the rod. Seals are conventionally provided between the piston head and chamber, as well as between the rod and end cap, both to prevent leakage and to exclude outside contaminants from being introduced into the fluid system.

Figure 2:
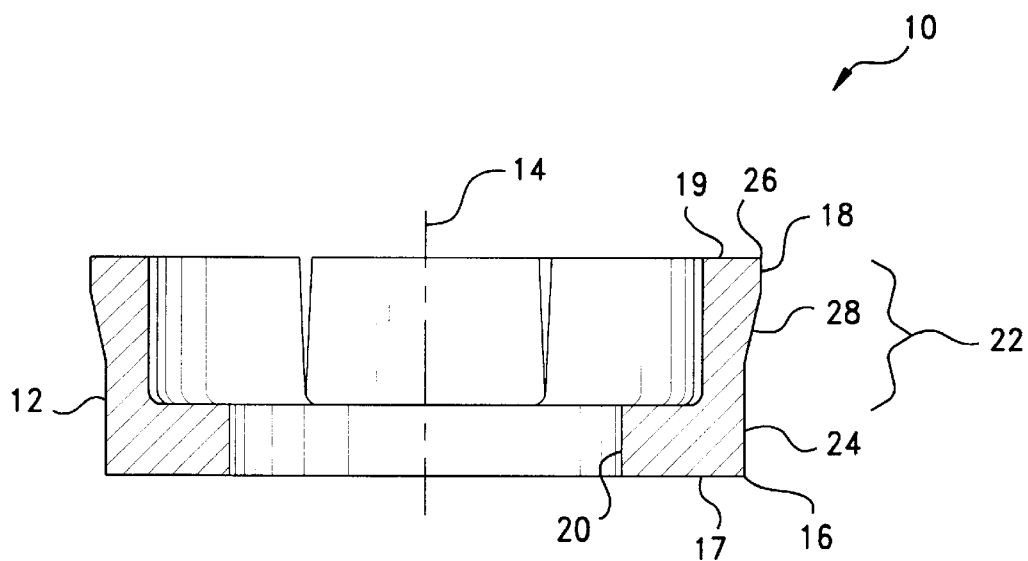
FIG. 2 is an axial cross-sectional view of the retainer of FIG. 1 taken through line 2—2 of FIG. 1.

Referring then to the figures wherein corresponding reference characters are used to designate corresponding elements throughout the several views with equivalent elements being referenced with prime or sequential alphanumeric designations, a representative retainer according to the present invention is shown generally at 10 in FIGS. 1 and 2. In basic construction, retainer 10 includes a generally annular body, 12, which extends along a longitudinal axis referenced at 14 in FIG. 2 from a forward end portion, 16, which terminates at a corresponding forward radial end surface, 17, to a rearward end portion, 18, which terminates at a corresponding rearward radial end surface, 19. Forward end portion 16 may be configured as is shown to include a radially inwardly-extending collar, 20, which defines the inner diametric extent of the retainer body 12. Rearward end portion 18, in turn, is divided into a plurality of arcuate segments or arms, one of which is referenced generally at 22, which are suspended or "cantilevered" to be resiliently yieldable in the manner to be described hereinafter. As may be seen best in the cross-sectional view of FIG. 2, each of the segments 22 extends from a respective proximal end, 24, to a respective distal end, 26. Each of the segment distal end portions 24 is configured as having a camming surface, 28, which is angled to extend radially-outwardly with respect to axis 14 in defining the outer diametric extent of the retainer body 12.

Depending upon the chosen material of construction, retainer body 12 may be fabricated by molding, forging, machining, or other conventional forming processes. Such material generally will be corrosion resistant and otherwise selected for compatibility with the fluid being handles or for desired mechanical properties. Preferred materials of construction for retainer body 12, which materials may include glass-filled and other filled or unfilled plastics and other polymeric materials, as well as ferrous or nonferrous metals such as mild steel, stainless steel, and brass, are broadly classified as "resilient" or otherwise as those materials which exhibit flexural properties such as hysteresis or elastic deformation, i.e., spring or "snap-back," to accommodate the resilient yielding of segments 22. Particularly preferred for reasons of cost and performance are filled or unfilled plastic materials such as poly(ether ether ketones), polyetherketones, polyurethanes, polyimides, high molecular weight polyethylenes and other polyolefins, polyetherimides, polybutylene terephthalates, nylons and other polyamides, fluoropolymers, polysulfones, polyesters, polyvinyl chloride, acetal homo and copolymers, and copolymers, alloys, and blends thereof. The selected metal or plastic material optionally may be annealed or otherwise heat- or chemically-treated to achieve the desired degree of resiliency.

Figure 3:
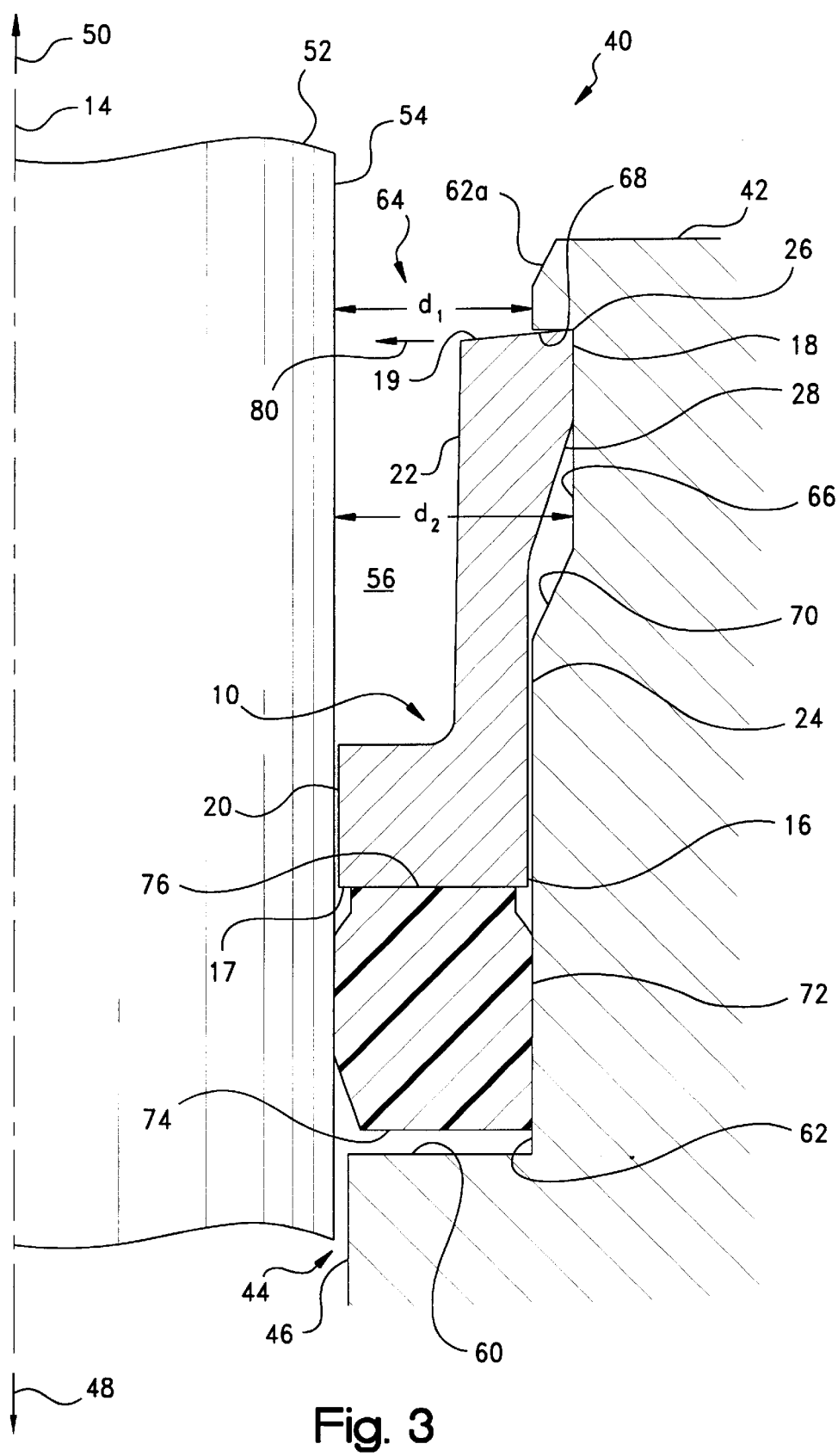
FIG. 3 is a partial view in longitudinal cross-section of a representative machine assembly according to the present invention wherein the retainer of FIG. 1 is employed to retain a fluid seal mounted intermediate the concentric surfaces of a pair of reciprocating machine parts.

Turning next to FIG. 3, retainer 10 of the present invention reappears as installed within a representative machine assembly, shown generally at 40, which may be, for example, a double-acting hydraulic or pneumatic cylinder. Cylinder assembly 40 conventionally includes a stationary housing or other first machine part, 42, having a bore, 44, with an internal, generally annular surface, 46. Bore annular surface 46 extends along a central longitudinal axis, commonly referenced with the retainer axis 14, in a forward direction, represented by arrow 48, which typically will be towards an upstream or high pressure side of the assembly, and in a rearward direction, represented by arrow 50, which typically will be towards a downstream low or atmospheric fluid pressure side of the assembly. Assembly 40 also includes a movable piston rod, head, or other second machine part, 52, having an outer, generally cylindrical surface, 54, which extends along axis 14 as disposed in concentric opposition to the annular surface 46 of the stationary housing part 42. Piston rod part 52 is reciprocable along axis 12 axis in the forward and rearward directions 48 and 50 intermediate the high and low fluid pressure sides of the assembly.

In accordance with the precepts of the present invention, the annular surface 46 of the housing part 42 is provided as having a gland, 56, defined therein intermediate the high and low pressure fluid sides of the assembly 40. Gland 56 is formed as having a forward end wall, 60, and a first peripheral wall, 62, which extends radially-circumferentially about axis 14. First peripheral wall 62 is spaced-apart a first radial distance, referenced at $d_1$, from the opposing cylindrical surface 54 of rod part 52, and extends axially intermediate the forward end wall 60, and an open rearward end, referenced at 64. A second radially circumferentially-extending peripheral wall, 66, is formed contiguously with first peripheral wall 62 intermediate forward end wall 60 and open rearward end 64, and is spaced-apart a second radial distance, $d_2$, greater than the first radial distance $d_1$ from the opposing rod part cylindrical surface 54. Second peripheral wall 66 extends axially in rearward direction 50 along axis 14 to a terminal rearward end wall, 68, which is shown in the illustrative arrangement of FIG. 3 to extend from the second peripheral wall 66 to a radial extent which is generally coterminous with the radial extent $d_1$ of the housing part surface 62. The transition between the first and second peripheral walls 62 and 66 may be radiused or, as is shown at 70, tapered to minimize any sharp points of contact.

For effecting a fluid seal intermediate the annular surface 46 of bore 44 and the cylindrical surface 54 of rod 52, a generally annular seal member, 72, is mounted coaxially within gland 56 to be compressible radially intermediate the rod surface 54 and the gland first peripheral wall 62. Depending upon the application, seal member 72 may be provided as a bidirectionally-sealing O-ring or D-ring (as shown), or, alternatively, as a unidirectionally- or bidirectionally-sealing U-cup or other profiled member. Generally, however, seal member 72 may be characterized as having axially spaced-apart forward and rearward end faces, 74 and 76, respectively, which are disposed in confrontation with, respectively, the forward end wall 60 of gland 56 and the forward radial end surface 17 of retainer body 12.

Seal member 72 is retained by means of retainer 10 within gland 56 intermediate the forward end wall 60 thereof and the forward radial end surface 17 of the retainer body 12. In this regard, retainer body 12 will be appreciated to be sized radially and otherwise configured to be receivable coaxially, i.e., concentrically, intermediate the housing and rod parts 42 and 52, with the retainer body forward end portion 16 further being sized to be receivable within gland 56. Thus, with seal member 72 being mounted with gland 56, the forward end portion 16 of retainer body 12 may be advanced forwardly through the open rearward end 64 of gland 56 coaxially along the first peripheral wall 62 and into disposition within the gland intermediate second peripheral wall 66 and forward end wall 60. Upon the advancement of the retainer body forward end portion 16 a given extent into gland 56, the camming surfaces 28 of the segment distal ends 26 bearingly engage the rearward portion of the first peripheral wall which is referenced at 62a in FIG. 3. Such engagement effects the radial inward collapse in the direction referenced by arrow 80 of the segments 22 from their normal orientation to a collapsed diametric extent which may be about 5–10% or more smaller than the diametric extent $d_1$, and which thereby allows for the continued advancement of the retainer forward end portion 16 towards its ultimate disposition within the gland 56 intermediate the second peripheral wall 66 and forward end wall 60 thereof. Thereafter contact with the peripheral wall 62a, segments 22 are moved with the continuing advancement of the retainer forward end portion 16 into contact with the second peripheral wall 66 and thereupon are able to substantially recover to their normal orientation, such orientation effecting an interfering engagement with the gland rearward end wall 68. That is, the rearward radial end surface 19 of the retainer body 12 is abuttingly engageable with the gland rearward end wall 68 delimiting the rearward movement of the retainer forward end portion 16 out of its disposition within gland 56. In this way, seal member 72 is retained within gland 56 intermediate the gland forward end wall 60 and the forward radial surface 17 of retainer body 12.

Seal member 72 is retained by means of retainer 10 within gland 56 intermediate the forward end wall 60 thereof and the forward radial end surface 17 of the retainer body 12. In this regard, retainer body 12 will be appreciated to be sized radially and otherwise configured to be receivable coaxially, i.e., concentrically, intermediate the housing and rod parts 42 and 52, with the retainer body forward end portion 16 further being sized to be receivable within gland 56. Thus, with seal member 72 being mounted with gland 56, the forward end portion 16 of retainer body 12 may be advanced forwardly through the open rearward end 64 of gland 56 coaxially along the first peripheral surface 62 and into disposition within the gland intermediate second peripheral surface 66 and forward end wall 60. Upon the advancement of the retainer body forward end portion 16 a given extent into gland 56, the camming surfaces 28 of the segment distal ends 26 bearingly engage the rearward portion of the first peripheral reference which is referenced at 62a in FIG. 3. Such engagement effects the radial inward collapse in the direction referenced by arrow 80 of the segments 22 from their normal orientation to a collapsed diametric extent which may be about 5–10% or more smaller than the diametric extent $d_1$, and which thereby allows for the continued advancement of the retainer forward end portion 16 towards its ultimate disposition within the gland 56 intermediate the second peripheral surface 66 and forward end wall 60 thereof. Thereafter contact with the peripheral surface 62a, segments 22 are moved with the continuing advancement of the retainer forward end portion 16 into contact with the second peripheral surface 66 and thereupon are able to substantially recover to their normal orientation, such orientation effecting an interfering engagement with the gland rearward end wall 68. That is, the rearward radial end surface 19 of the retainer body 12 is abuttingly engageable with the gland rearward end wall 68 delimiting the rearward movement of the retainer forward end portion 16 out of its disposition within gland 56. In this way, seal member 72 is retained within gland 56 intermediate the gland forward end wall 60 and the forward radial surface 17 of retainer body 12.

Optionally, the rearward end face 76 of seal member 72 may be bonded or otherwise joined to the faying forward radial end surface 17 of retainer body 12 to form an integral retainer and seal member 10 and 72. In this regard, retainer 10 may be molded or otherwise formed of a first polymeric material, such as a glass-filled polyurethane, with seal member 72 being co-molded with, or sequentially molded on, retainer 10 as formed of a second polymeric material, such as a thermoplastic or other polyurethane elastomer, which is self-bonding to the first material. As compared to the second polymeric material forming seal member 72, the first polymeric material forming retainer 10 typically will be selected as having a higher modulus or otherwise as being relatively harder, tougher, and/or more rigid.

If formed of chemically dissimilar or otherwise incompatible materials, however, retainer 10 and seal member 72 may be bonded using an adhesive or via a intermediate "tie" layer formed of a third polymeric material with is compatible with the first and second polymeric materials. As incorporated into a unitary assembly with retainer 10, seal member 72 may be advanced with the retainer forward end portion 16 forwardly through the gland 64 open rearward end coaxially along the first peripheral wall 62 thereof and into disposition within the gland 56.

Figure 4:
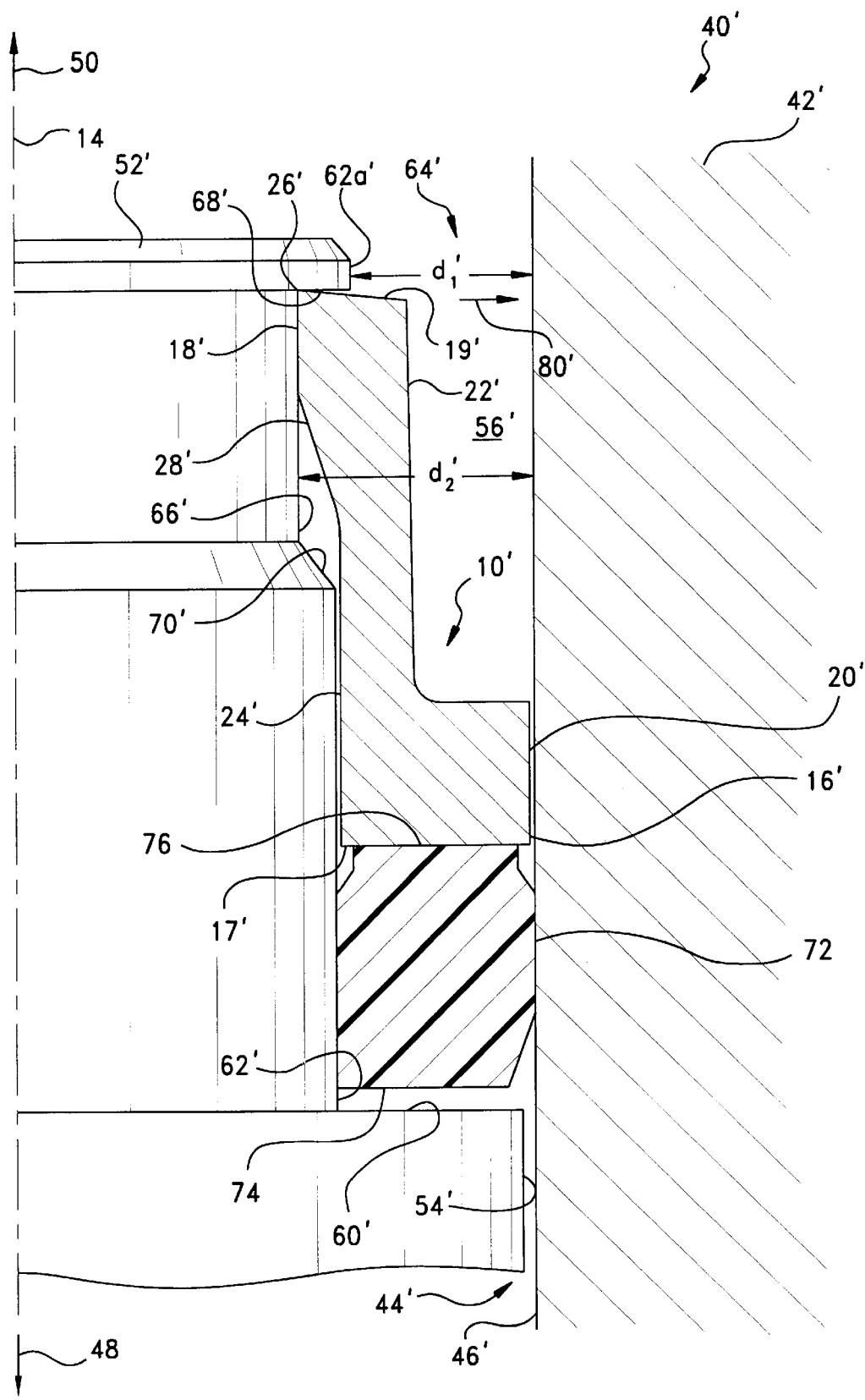
FIG. 4 is a partial view in longitudinal cross-section of another representative machine assembly according to the present invention wherein the retainer of the present invention is employed to retain a fluid seal mounted intermediate the concentric surfaces of a pair of reciprocating machine parts.

Referring next to FIG. 4, an alternative embodiment of retainer 10 of the present invention is referenced generally at 10' as configured for installation directly on the rod, piston, or other second machine part 52' of the machine assembly 40'. Retainer 10' similarly includes generally annular body 12' which extends along longitudinal axis 14 from forward end portion 16', which terminates at corresponding forward radial end surface 17', to rearward end portion 18', which terminates at corresponding rearward radial end surface 19'. Forward end portion 16' may be configured as is shown to include a radially outwardly-extending collar, 20', which in the embodiment 10' defines the outer diametric extent of the retainer body 12'. Rearward end portion 18', in turn, is divided into a plurality of resilient segments 22', each of which extends, as before, from a respective proximal end 24' to a respective distal end 26' having a camming surface 28.' In the embodiment 10', however, the camming surfaces 28' now are angled to extend radially-inwardly with respect to axis 14 in defining the inner diametric extent of the retainer body 12'.

As did assembly 40 of FIG. 3, cylinder assembly 40' of FIG. 4 conventionally includes a stationary housing or other first machine part 42' having a bore 44' with an internal, generally annular surface 46'. Bore annular surface 46' extends along axis 14 in the forward and rearward directions 48 and 50. As mentioned, assembly 40' also includes a movable rod, piston, or other second machine part 52' having a generally cylindrical outer surface 54' which extends along axis 14 as disposed in concentric opposition to the annular surface 46' of the stationary housing part 42'. Piston rod part 52' is reciprocable along axis 12 axis in the forward and rearward directions 48 and 50 intermediate the high and low fluid pressure sides of the assembly.

In further accordance with the precepts of the present invention, the cylindrical surface 54' of the rod part 52' is provided as having a gland 56' defined therein intermediate the high and low pressure fluid sides of the assembly 40'.

Gland 56' again is formed as having a forward end wall 60' and a first peripheral wall 62' which extends radially-circumferentially about axis 14. First peripheral wall 62' is spaced-apart a first radial distance $d_1$' from the opposing annular surface 46' of housing part 42', and extends axially intermediate the forward end wall 60', and open rearward end 64'. Second radially circumferentially-extending peripheral wall 66' is formed contiguously with first peripheral wall 62' intermediate forward end wall 60' and open rearward end 64', and is spaced-apart a second radial distance $d_2$' greater than the first radial distance $d_1$' from the opposing housing part annular surface 46'. Second peripheral wall 66' extends axially in rearward direction 50 along axis 14 to terminal rearward end wall 68', which again is shown in the illustrative arrangement of FIG. 4 to extend from the second peripheral wall 66' to a radial extent which is generally coterminous with the radial extent $d_1$' of the rod part surface 54'. As before, the transition between the first and second peripheral walls 62' and 66' may be radiused or, as is shown at 70', tapered to minimize any sharp points of contact.

As in assembly 40 of FIG. 3, assembly 40' of FIG. 4 also includes generally annular seal member 72 having axially spaced-apart forward and rearward end faces 74 and 76. In assembly 40', however, seal member 72 is mounted coaxially within gland 56' to be compressible radially intermediate the gland first peripheral wall 62' and the housing part surface 46'.

Seal member 72 is retained by means of retainer 10' within gland 56' intermediate the forward end wall 60' thereof and the forward radial end surface 17' of the retainer body 12'. In this regard, retainer body 12' will be appreciated to be sized radially and otherwise configured to be receivable coaxially intermediate the housing and rod parts 42' and 52', with the retainer body forward end portion 16' further being sized to be receivable within gland 56'. Thus, with seal member 72 being mounted with gland 56', the forward end portion 16' of retainer body 12' may be advanced forwardly through the open rearward end 64 of gland 56 coaxially along the first peripheral wall 62' and into disposition within the gland intermediate second peripheral wall 66' and forward end wall 60'. Upon the advancement of the retainer body forward end portion 16' a given extent into gland 56', the camming surfaces 28' of the segment distal ends 26' bearingly engage the rearward portion of the first peripheral wall which is referenced at 62a' in FIG. 4. Such engagement effects the radial outward expansion in the direction referenced by arrow 80' of the segments 22' from their normal orientation to an expanded diametric extent which may be about 5–10% or more greater than the diametric extent $d_1$, and which thereby allows for the continued advancement of the retainer forward end portion 16' towards its ultimate disposition within the gland 56' intermediate the second peripheral wall 66' and forward end wall 60' thereof. Thereafter contact with the peripheral wall 62a', segments 22' are moved with the continuing advancement of the retainer forward end portion 16' into contact with the second peripheral wall 66' and thereupon are able to substantially recover to their normal orientation, such orientation effecting an interfering engagement with the gland rearward end wall 68'. That is, the rearward radial end surface 19' of the retainer body 12' is abuttingly engageable with the gland rearward end wall 68' delimiting the rearward movement of the retainer forward end portion 16' out of its disposition within gland 56'. In this way, seal member 72 is retained within gland 56' intermediate the gland forward end wall 60' and the forward radial surface 17' of retainer body 12'. As before, the rearward end face 76 of seal member 72 optionally may be bonded or otherwise joined to the faying forward radial end surface 17' of retainer body 12' to form an integral retainer and seal member 10 and 72.

Figure 6:
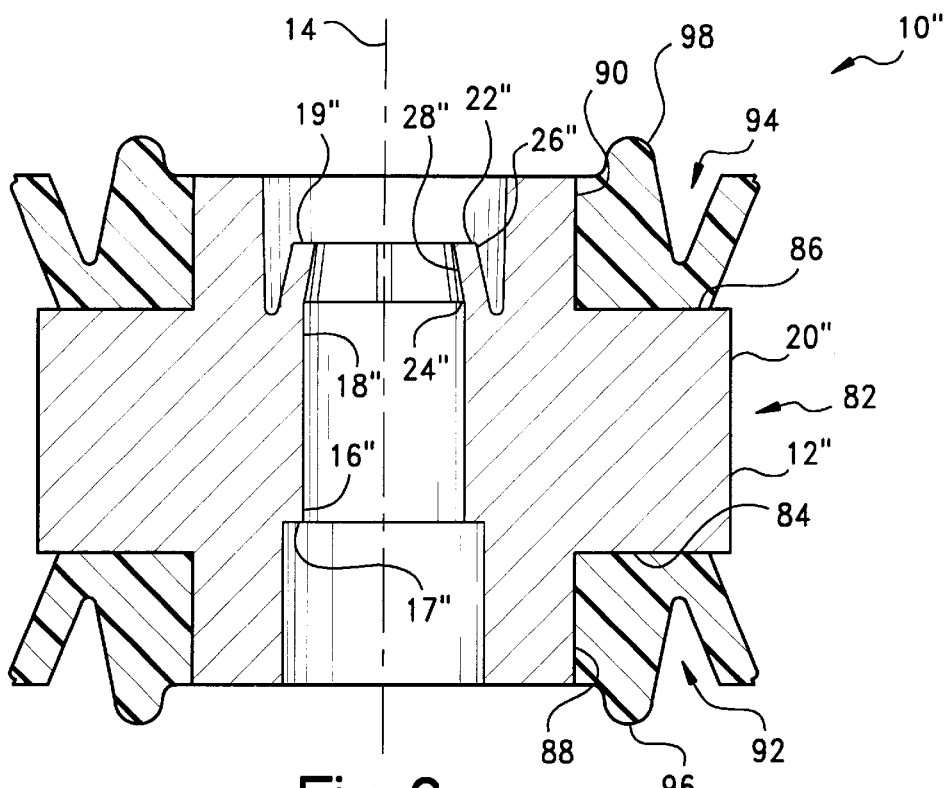
FIG. 6 is a cross-sectional view of the retainer of FIG. 5 taken through line 6—6 of FIG. 5.
Figure 5:
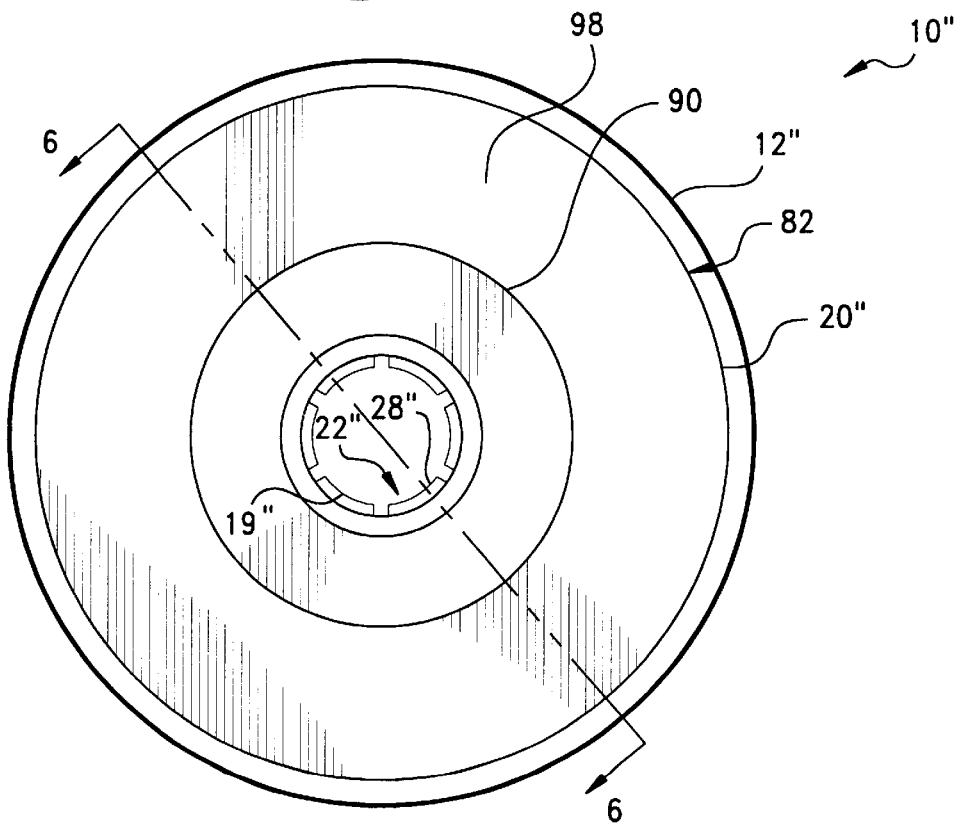
FIG. 5 is a forward end view of an alternative embodiment of the retainer of the present invention wherein the retainer is configured for use as a piston head.

Turning now to FIGS. 5 and 6, another alternative embodiment of retainer 10 of the present invention is referenced generally at 10" as configured as a piston head for installation directly on the rod, piston, or other second machine part 52" of the machine assembly 40". Retainer 10" similarly includes generally annular body 12" which may be seen in FIG. 6 to extend along longitudinal axis 14 from forward end portion 16", which terminates at corresponding forward radial end surface 17", to rearward end portion 18", which terminates at corresponding rearward radial end surface 19". Forward end portion 16" may be configured as is shown to include a radially outwardly-extending collar, 20", which in the embodiment 10" functions as the outer diametric extent of the retainer body 12". Retainer body rearward end portion 18", in turn, is divided into a plurality of resilient segments 22", each of which extends, as before, from a respective proximal end 24" to a respective distal end 26" having a camming surface 28." As in the embodiment 10', the camming surfaces 28" are angled to extend radially-inwardly with respect to axis 14 in defining the inner diametric extent of the retainer body 12".

As may be seen best in the cross-sectional view of FIG. 6, collar 20" further functions in the embodiment 10" as a circumferentially-extending piston head portion, referenced generally at 82, which is defined between a radially-outwardly extending forward radial surface, 84, and a radially-outwardly extending rearward radial surface, 86, spaced-apart from the forward radial surface 82 along longitudinal axis 14. Generally annular forward and reared boss portions, 88 and 90, additionally may be provided to extend axially from inboard positions adjacent a corresponding one of the surfaces 84 and 86 in defining a gland, referenced generally at 92 and 94, therebetween. Each of the glands 92 and 94 may be configured to receive an associated seal member, 96 and 98, which may be interference fit or, preferably, molded in the glands to provide for the forward and rearward fluid sealing of the piston head portion 82. As before, and upon the application, seal members 92 and 94 may be provided as a bidirectionally-sealing O-ring or D-ring, or, alternatively and as is shown, as a unidirectionally- or bidirectionally-sealing U-cup or other profiled member. Suitable materials of construction again include natural and synthetic rubbers, as well as other polymers which may be broadly classified as exhibiting rubber-like properties.

Figure 7:
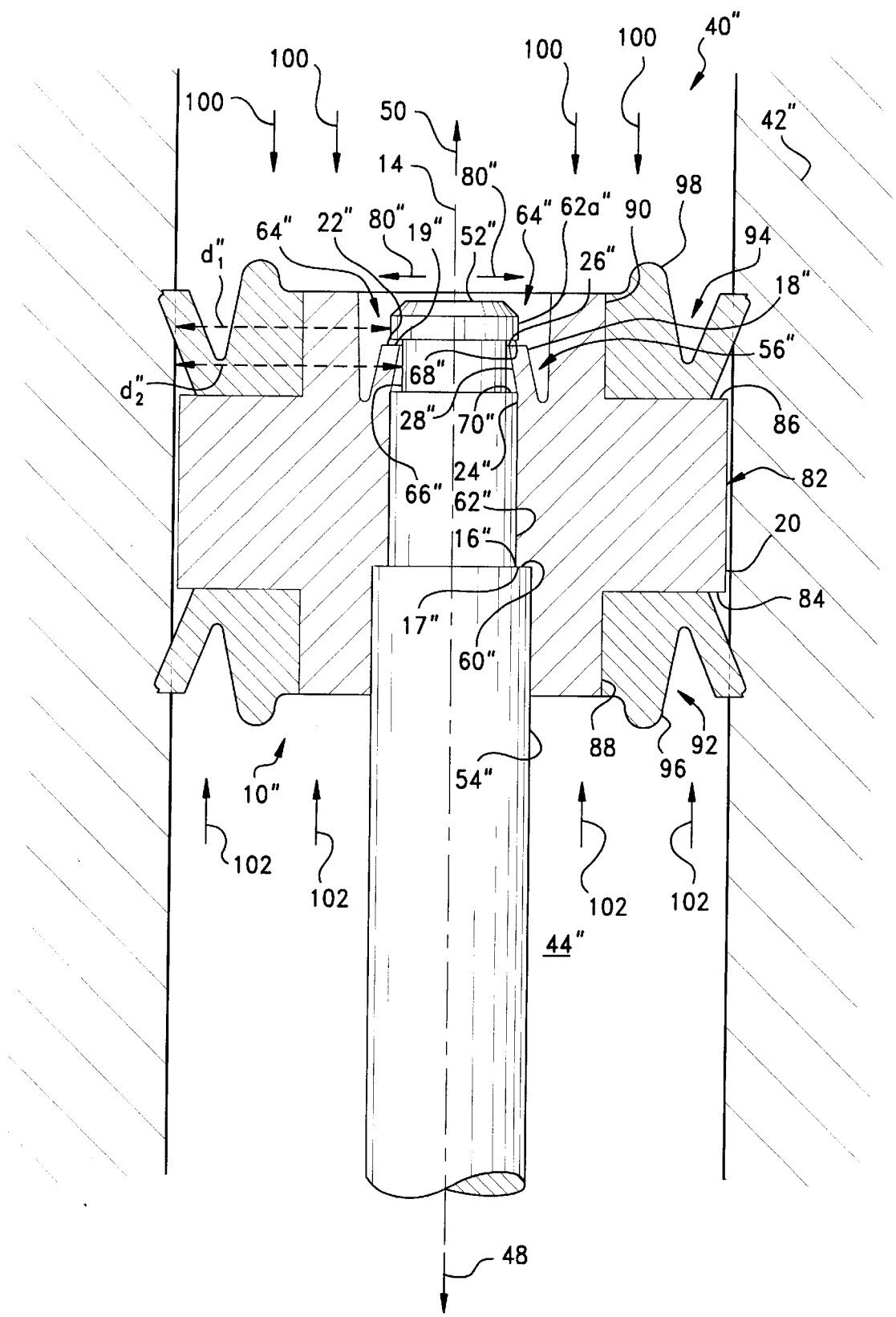
FIG. 7 is a longitudinal cross-section view of another representative machine assembly according to the present invention wherein the piston head of FIG. 6 is mounted on a rod which is received within a within a housing to be reciprocatable responsive to an applied fluid pressure.

Turning lastly to FIG. 7, retainer 10" of the present invention reappears as installed within a representative cylinder assembly 40". Assembly 40" includes stationary housing part 42" having a bore 44" with an internal annular surface 46" extending along axis 14 in the forward and rearward directions 48 and 50. Movable rod part 52" is coaxially disposed within bore 44" as having a generally cylindrical outer surface 54" which extends along axis 14 in concentric opposition to the housing part annular surface 46". Rod part 52" is reciprocable along axis 12 axis in the forward and rearward directions 48 and 50.

In still further accordance with the precepts of the present invention, the cylindrical surface 54" of the rod part 52" is provided as having a gland 56" defined therein intermediate the forward and rearward sides of the assembly 40". Gland 56" is formed as having a forward end wall 60" and a first peripheral wall 62" which extends radially-circumferentially about axis 14. First peripheral wall 62" is spaced-apart a first radial distance $d_1$" from the opposing annular surface 46" of housing part 42", and extends axially intermediate the forward end wall 60", and open rearward end 64". Second radially circumferentially-extending peripheral wall 66" is formed contiguously with first peripheral wall 62" intermediate forward end wall 60" and open rearward end 64", and is spaced-apart a second radial distance $d_2"$ greater than the first radial distance $d_1"$ from the opposing housing part annular surface 46". Second peripheral wall 66" extends axially in rearward direction 50 along axis 14 to terminal rearward end wall 68", which is shown in the illustrative arrangement of FIG. 4 to extend from the second peripheral wall 66" to a radial extent which is generally coterminous with the radial extent $d_1"$ of the rod part surface 54". In the assembly 40", the transition between the first and second peripheral walls 62" and 66" is formed as a generally perpendicular step 70".

As before, retainer body 12" is sized radially and otherwise configured to be receivable coaxially intermediate the housing and rod parts 42" and 52", with the retainer body forward end portion 16" further being sized to be receivable within gland 56". Thus, with seal members 96 and 98 being molded or otherwise mounted with their corresponding glands 92 and 94, the forward end portion 16" of retainer body 12" may be advanced forwardly through the open rearward end 64 of gland 56 coaxially along the first peripheral wall 62" and into disposition within the gland intermediate second peripheral wall 66" and forward end wall 60". Upon the advancement of the retainer body forward end portion 16" a given extent into gland 56", the camming surfaces 28" of the segment distal ends 26" bearingly engage the rearward portion of the first peripheral wall which is referenced at 62a" in FIG. 7. Such engagement effects the radial outward expansion in the direction referenced by arrow 80" of the segments 22" from their normal orientation to an expanded diametric extent which may be about 5–10% or more greater than the diametric extent $d_1$, and which thereby allows for the continued advancement of the retainer forward end portion 16" towards its ultimate disposition within the gland 56" intermediate the second peripheral wall 66" and forward end wall 60" thereof. Thereafter contact with the peripheral wall 62a", segments 22" are moved with the continuing advancement of the retainer forward end portion 16" into contact with the second peripheral wall 66" and thereupon are able to substantially recover to their normal orientation, such orientation effecting an interfering engagement with the gland rearward end wall 68". That is, the rearward radial end surface 19" of the retainer body 12" is abuttingly engageable with the gland rearward end wall 68" delimiting the rearward movement of the retainer forward end portion 16" out of its disposition within gland 56".

In this way, the piston portion 82 thereby may be retained within gland 56" as operatively coupled to rod 52". Piston portion 82 thus may be made responsive to a first pressure, referenced by arrows 100, acting on rearward radial surface 86 to move rod 52" in the forward direction 48. Alternately, piston portion 82 thus may be made responsive to a second fluid pressure, referenced by arrows 102, acting on forward radial surface 84 to move rod 52" in the rearward direction 50.

It is anticipated that certain changes may be made in the present invention without departing from the precepts herein involved. Accordingly, the foregoing description should be interpreted as illustrative and not in a limiting sense. All references cited herein are expressly incorporated by reference.

What is claimed is:

1. A machine assembly comprising:
    a first machine part having a generally annular surface which extends along a central longitudinal axis;
    a second machine part having a generally cylindrical surface disposed in concentric opposition to the annular surface of the first machine part and a first one of the surfaces of the first and second machine parts having a gland defined therein, the gland having a forward end wall and a first peripheral wall spaced-apart a first radial distance from an opposing second one of the surfaces of the first and second machine parts and extending intermediate the forward end wall and an open rearward end, and having a second peripheral wall formed contiguously with the first peripheral wall intermediate the forward end wall and the open rearward end, the second peripheral wall being spaced-apart a second radial distance greater than the first radial distance from the opposing second one of the surfaces of the first and second machine parts, and terminating at a rearward end wall; and
    a retainer disposed coaxially intermediate said first and said second machine part, said retainer including a generally annular body extending along said longitudinal axis from a forward end portion receivable within the gland to a rearward end portion configured as defining a plurality of cantilevered segments, each of said segments extending from a proximal end to a distal end and having a camming surface, and being resiliently yieldable responsive to the bearing of said camming surface on the first peripheral wall of the gland allowing said retainer forward end portion to be advanced forwardly through the open rearward end of the first gland coaxially along the first peripheral wall thereof and into disposition within the gland intermediate the second peripheral wall and the forward end wall thereof, said distal end of said segments being interferingly engaged with the rearward end wall of the gland delimiting rearward movement of the retainer forward end portion out of disposition within the gland and, wherein at least one said machine part is reciprocable relative to the other said machine part in a forward and a rearward direction along the central longitudinal axis.

2. The assembly of claim 1 wherein said forward end portion of said retainer body terminates at a forward radial end surface and said rearward end portion of said retainer body terminates at a rearward radial end surface, and wherein said assembly further comprises a generally annular fluid seal member mounted within said gland intermediate the forward end wall thereof and the forward radial end surface of said retainer body, said rearward radial end surface of said retainer body being abuttingly engaging the rearward end wall of said gland to retain said seal member intermediate the gland forward end wall and the forward radial end surface of said retainer body.

3. The assembly of claim 2 wherein said seal member has axially spaced-apart forward and rearward end faces disposable in confrontation with, respectively, the forward end wall of said gland and the forward radial end surface of said retainer, the rearward end face of said seal member being bonded to the forward radial end surface of said retainer body.

4. The assembly of claim 3 wherein said seal member is formed of a first polymeric material and wherein said retainer is formed of a second polymeric material different from said first material.

5. The assembly of claim 4 wherein said first polymeric material is an elastomeric material selected from the group consisting of filled or unfilled natural rubbers, synthetic rubbers, and fluoropolymers, and wherein said second polymeric material is a resilient plastic material.

6. The assembly of claim 1 wherein the gland is defined within the first machine part annular surface with the gland first peripheral wall having a given first diametric extent, and wherein the camming surface of said retainer body segments extends radially outwardly with respect to said longitudinal axis to define a second diametric extent of said segments which is greater than the first diametric extent of the gland first peripheral wall, said segments being collapsible radially inwardly responsive to the bearing of said camming surface on the gland first peripheral wall allowing the retainer body forward end portion to be advanced therealong.

7. The assembly of claim 1 wherein the gland is defined within the second machine part cylindrical surface with the gland first peripheral wall having a given first diametric extent, wherein the camming surface of said retainer body segments extends radially inwardly with respect to said longitudinal axis to define a second diametric extent of said segments which is less than the first diametric extent of the gland first peripheral wall, said segments being expandable radially outwardly responsive to the bearing of said camming surface on the gland first peripheral wall allowing the retainer body forward end portion to be advanced therealong.

8. The assembly of claim 7 wherein said retainer is configured as having a radially-outwardly extending forward radial surface and a radially-outwardly extending rearward radial surface spaced-apart from said forward radial surface along said longitudinal axis to define a circumferentially-extending piston head portion therebetween, said piston head portion being responsive to a fluid pressure acting on one of said forward or said rearward radial surface to move said second machine part in a corresponding forward or rearward direction.

9. The assembly of claim 1 wherein the gland rearward end wall extends radially from the second peripheral wall generally coterminously with the first peripheral wall.

10. A method of retaining a component within a machine assembly including a first machine part having a generally annular surface which extends along a central longitudinal axis, and a second machine part having a generally cylindrical surface disposed in concentric opposition to the annular surface of the first machine part, said method comprising the steps of:

(a) providing a first one of the surfaces of the first and second machine parts as having gland defined therein, the gland having a forward end wall and a first peripheral wall spaced-apart a first radial distance from an opposing second one of the surfaces of the first and second machine parts and extending intermediate the forward end wall and an open rearward end, and having a second peripheral wall formed contiguously with the first peripheral wall intermediate the forward end wall and the open rearward end, the second peripheral wall being spaced-apart a second radial distance greater than the first radial distance from the opposing second one of the surfaces of the first and second machine parts, and terminating at a rearward end wall;

(b) providing a retainer including a generally annular body configured to be receivable coaxially intermediate the first and second machine parts, said body extending along said longitudinal axis from a forward end portion receivable within the gland to a rearward end portion configured as defining a plurality of cantilevered segments each extending from a proximal end to a distal end and having a camming surface;

(c) advancing the forward end portion of said retainer forwardly through the open rearward end of the first gland coaxially along the first peripheral wall thereof and into disposition intermediate into disposition within the gland intermediate the second peripheral wall and the forward end wall thereof, said segments being resiliently yieldable responsive to the bearing of said camming surface on the first peripheral wall of the gland allowing the retainer forward end portion to be advanced along the first peripheral wall of the gland; and (d) interferingly engaging said distal end of said segments with the rearward end wall of the gland delimiting rearward movement of the retainer forward end portion out of disposition within the gland and, wherein at least one said machine part is reciprocable relative to the other said machine part in a forward and a rearward direction along the central longitudinal axis.

11. The method of claim 10 wherein said forward end portion of said retainer body terminates at a forward radial end surface and said rearward end portion of said retainer body terminates at a rearward radial end surface, said method further comprising the additional step prior to step (c) of mounting a generally annular fluid seal member within said gland, said rearward radial end surface of said retainer body being abuttingly engageable in step (d) with the rearward end wall of said gland to retain the seal member intermediate the gland forward end wall and the forward radial end surface of said retainer body.

12. The method of claim 10 wherein said forward end portion of said retainer body terminates at a forward radial end surface and said rearward end portion of said retainer body terminates at a rearward radial end surface, said method further comprising the additional steps prior to step (c) of:

providing a generally annular fluid seal member having a forward end face and an axially spaced-apart rearward end face; and bonding the rearward end face of said seal member to the forward radial end surface of said retainer body, said seal member being advanced in step (c) with the forward end portion of said retainer forwardly through the open rearward end of the first gland coaxially along the first peripheral wall thereof and into disposition within the gland, and said rearward radial end surface of said retainer body being abuttingly engageable in step (d) with the rearward end wall of said gland to retain the seal member intermediate the gland forward end wall and the forward radial end surface of said retainer body.

13. The method of claim 12 wherein said seal member is formed of a first polymeric material and wherein said retainer is formed of a second polymeric material different from said first material.

14. The method of claim 13 wherein said first polymeric material is an elastomeric material selected from the group consisting of filled or unfilled natural rubbers, synthetic rubbers, and fluoropolymers, and wherein said second polymeric material is a resilient plastic material.

15. The method of claim 10 wherein the gland is defined within the first machine part annular surface with the gland first peripheral wall having a given first diametric extent, and wherein the camming surface of said retainer body segments extends radially outwardly with respect to said longitudinal axis to define a second diametric extent of said segments which is greater than the first diametric extent of the gland first peripheral wall, said segments being collapsible radially inwardly responsive to the bearing of said camming surface on the gland first peripheral wall allowing the retainer body forward end portion to be advanced in step (c) along the gland first peripheral wall.

16. The method of claim 10 wherein the gland is defined within the second machine part cylindrical surface with the gland first peripheral wall having a given first diametric extent, wherein the camming surface of said retainer body segments extends radially inwardly with respect to said longitudinal axis to define a second diametric extent of said segments which is less than the first diametric extent of the gland first peripheral wall, said segments being expandable radially outwardly responsive to the bearing of said camming surface on the gland first peripheral wall allowing the retainer body forward end portion to be advanced in step (c) along the gland first peripheral wall.

17. The method of claim 16 wherein said retainer is configured as having a radially-outwardly extending forward radial surface and a radially-outwardly extending rearward radial surface spaced-apart from said forward radial surface along said longitudinal axis to define a circumferentially-extending piston head portion therebetween, said piston head portion being responsive to a fluid pressure acting on one of said forward or said rearward radial surface to move said second machine part in a corresponding forward or rearward direction.

18. The method of claim 10 wherein the gland rearward end wall extends radially from the second peripheral wall generally coterminously with the first peripheral wall.

* * * * *